(12) United States Patent
Gao et al.

(10) Patent No.: US 11,611,198 B2
(45) Date of Patent: Mar. 21, 2023

(54) VEHICLE-MOUNTED MOBILE TRANSFORMER WITH A POSITION-ADJUSTABLE LEAD-OUT BUSHING

(71) Applicants: State Grid Zhejiang Economic Research Institute, Zhejiang (CN); State Grid Wenzhou Electric Power Supply Company, Wenzhou (CN); China Energy Engineering Group Zhejiang Electric Power Design Institute Co. Ltd, Zhejiang (CN); Henan Pinggao Electric Co., LTD., Pingdingshan (CN)

(72) Inventors: Meijin Gao, Zhejiang (CN); Tingting Wang, Zhejiang (CN); Qian Di, Pingdingshan (CN); Junhua Yin, Pingdingshan (CN); Weijun Liu, Zhejiang (CN); Jianhua Yang, Wenzhou (CN); Huiwen Zhou, Zhejiang (CN); Yanhan Zhu, Zhejiang (CN); Jiangqian Huang, Zhejiang (CN); Jiarui Yang, Zhejiang (CN); Chu Li, Wenzhou (CN); Zhichao Zhou, Zhejiang (CN); Xuejing Kang, Pingdingshan (CN); Fangli Jia, Pingdingshan (CN); Jicheng Zhang, Pingdingshan (CN); Chaowei Qiao, Pingdingshan (CN); Jianyu Li, Zhejiang (CN); Xihui Xia, Zhejiang (CN)

(73) Assignees: STATE GRID ZHEJIANG ECONOMIC RESEARCH INSTITUTE, Zhejiang (CN); STATE GRID WENZHOU ELECTRIC POWER SUPPLY COMPANY, Wenzhou (CN); CHINA ENERGY ENGINEERING GROUP ZHEJIANG ELECTRIC POWER DESIGN INSTITUTE CO. LTD, Zhejiang (CN); HENAN PINGGAO ELECTRIC CO., LTD., Pingdingshan (CN)

(*) Notice: Subject to any disclaimer, the term of this patent is extended or adjusted under 35 U.S.C. 154(b) by 527 days.

(21) Appl. No.: 16/841,049

(22) Filed: Apr. 6, 2020

(65) Prior Publication Data
US 2021/0126437 A1 Apr. 29, 2021

(30) Foreign Application Priority Data
Oct. 23, 2019 (CN) .......................... 201911012340.5

(51) Int. Cl.
*H02B 13/035* (2006.01)
*H01F 27/06* (2006.01)
*H01F 27/04* (2006.01)

(52) U.S. Cl.
CPC ......... *H02B 13/0358* (2013.01); *H01F 27/04* (2013.01); *H01F 27/06* (2013.01); *H02B 13/0356* (2013.01)

(58) Field of Classification Search
CPC ....... H02B 1/52; H02B 13/0358; H01F 27/04; H01F 27/06
See application file for complete search history.

(56) References Cited

U.S. PATENT DOCUMENTS

| | | | | |
|---|---|---|---|---|
| 3,116,086 A | * | 12/1963 | Barengoltz | B60P 3/00 296/25 |
| 3,258,524 A | * | 6/1966 | Walling | H01B 17/265 174/18 |

(Continued)

FOREIGN PATENT DOCUMENTS

| | | | | |
|---|---|---|---|---|
| CH | 672861 A5 | * | 12/1989 | ............. H02B 1/052 |
| CN | 110718862 A | * | 1/2020 | ............. H02B 1/015 |

(Continued)

*Primary Examiner* — Robert J Hoffberg (74) *Attorney, Agent, or Firm* — Muncy, Geissler, Olds & Lowe, P.C.

(57) ABSTRACT

The present invention belongs to the technical field of mobile transformer substation, and in particular relates to a vehicle-mounted mobile transformer with a position-adjustable lead-out bushing. In view of the shortage that, when the existing conventional transformer is applied to a vehicle-mounted mobile transformer substation, the transportation dimension exceeds the regulated width, height and limit, the present invention adopts the following technical solution: a vehicle-mounted mobile transformer with a position-adjustable lead-out bushing, comprising: a transformer body; and a high-voltage lead-out bushing, the high-voltage lead-out bushing comprising an oil-SF6 gas bushing, an SF6 gas-air bushing and a connecting device, the oil-SF6 gas bushing being mounted on a high-voltage bushing base, the connecting device being mounted on the oil-SF6 gas bushing, the SF6 gas-air bushing being mounted on the connecting device, and the SF6 gas-air bushing being rotatable relative to the connecting device such that the position of the SF6 gas-air bushing is adjustable. The present invention has the beneficial effects that the SF6 gas-air bushing is rotatable, the position is adjustable and thus the transportation requirement of high-voltage (such as 220 kV) equipment is met.

10 Claims, 5 Drawing Sheets

(56) References Cited

U.S. PATENT DOCUMENTS

| | | | | |
|---|---|---|---|---|
| 4,562,360 A | * | 12/1985 | Fujimoto | H02B 1/52 361/603 |
| 6,586,697 B1 | * | 7/2003 | Enns | H02B 1/52 218/7 |
| 9,768,594 B2 | * | 9/2017 | Errico | H02B 5/06 |
| 9,997,896 B2 | * | 6/2018 | Mauri Lopez | H02B 1/52 |

FOREIGN PATENT DOCUMENTS

| | | | | |
|---|---|---|---|---|
| CN | 112821268 A | * | 5/2021 | H02B 5/06 |
| CN | 214543269 U | * | 10/2021 | H02B 5/06 |
| FR | 2698737 A1 | * | 6/1994 | H02B 1/52 |
| JP | 4966246 B2 | * | 7/2012 | H02B 3/00 |

* cited by examiner

VEHICLE-MOUNTED MOBILE TRANSFORMER WITH A POSITION-ADJUSTABLE LEAD-OUT BUSHING

FIELD OF THE INVENTION

The present invention belongs to the technical field of mobile transformer substation, and in particular relates to a vehicle-mounted mobile transformer with a position-adjustable lead-out bushing.

BACKGROUND OF THE INVENTION

In the face of sudden power equipment failure, natural disaster or temporary alternative power supply demand, a vehicle-mounted mobile transformer substation can be deployed for use in the substation of the corresponding voltage level at any time to ensure the stable power supply of the grid. The vehicle-mounted mobile transformer substation is mobile and flexible, convenient to transport and highly adaptable to roads, and does not need to occupy the land for a long time. It is a low-cost high-benefit innovative solution in a limited space.

Based on the original transformer technology, the vehicle-mounted mobile transformer is designed as a whole to be vehicle-mounted: the high-voltage bushing adopts the side outgoing line manner, and the oil conservator adopts a flat design. At the same time, the internal structure of the transformer, including its core and windings, is strengthened, and its safe use performance is guaranteed through strict calculations. However, due to the limitations on structure and dimension of the large-capacity oil immersed transformer, the overall transportation of the transformer is greatly limited, and the requirement of road transportation cannot be met. As a result, the transportation cost of the whole substation increases, and the advantage of rapid field response of the mobile transformer substation is significantly limited. The problem that the dimension of the transformer used in the mobile transformer substation exceeds the limit during transportation has not been solved effectively.

The limitations on structure and dimension of the large-capacity oil immersed transformer are mainly reflected in the following aspects: when the transformer uses a composite bushing for an outgoing line, under the situation of considering no correction, a 110 kV transformer can be transported as a whole by using a vehicle board with a width of 3 m; for the transformer of high-altitude correction or with a voltage level above 110 kV, in order to meet the electrical insulation distance, a 3 m-wide vehicle plate cannot meet the requirement of its overall transportation; if the overhead connection is not considered and the oil-gas bushing is adopted for direct connection, the transformer and the switchgear device of low voltage level can be considered to be arranged in the same vehicle, but the requirements on relative positions of the transformer and the high-voltage switch of high voltage level are extremely strict, and arranging the transformer and the switchgear device of high voltage level in the same vehicle will have the problems such as over length and oversized turning radius.

In short, the high-voltage side of the power transformer usually consists of a high-voltage bushing base and a high-voltage bushing. According to the current design, the height of the high-voltage bushing base and the high-voltage bushing as well as the overall width of the three phases usually exceed the road transportation requirements, the transportation cost is high, even more the regulated width, height and limit are exceeded, which does not meet the requirements of traffic regulations, and there are risks of traffic control and punishment.

SUMMARY OF THE INVENTION

Aiming at the shortage that, when the existing conventional transformer is applied to the vehicle-mounted mobile transformer substation, the transportation dimension exceeds the regulated width, height and limit, the present invention provides a vehicle-mounted mobile transformer with a position-adjustable lead-out bushing, which can reduce the dimension during transportation and meet the requirement of flexible transportation of the transformer.

In order to realize the above purpose, the present invention adopts the following technical solution: a vehicle-mounted mobile transformer with a position-adjustable lead-out bushing, comprising:

a transformer body, the transformer body being provided with a high-voltage bushing base; and a high-voltage lead-out bushing, the high-voltage lead-out bushing comprising an oil-SF6 gas bushing, an SF6 gas-air bushing and a connecting device, the oil-SF6 gas bushing being mounted on the high-voltage bushing base, the connecting device being mounted on the oil-SF6 gas bushing, the SF6 gas-air bushing being mounted on the connecting device, and the SF6 gas-air bushing being rotatable relative to the connecting device such that the position of the SF6 gas-air bushing is adjustable.

The vehicle-mounted mobile transformer provided by the present invention is connected with the high-voltage switch through the oil-SF6 gas bushing, the connecting device and the SF6 gas-air bushing, the SF6 gas-air bushing is rotatable relative to the connecting device, the position of the SF6 gas-air bushing is adjustable, and thus the SF6 gas-air bushing can be rotated to a suitable position for transportation; the transformer is connected with the high-voltage switch through the SF6 gas-air bushing, and thus it is easier to operate than when it is directly with the high-voltage switch through the oil-gas bushing. The rotation angle of the SF6 gas-air bushing is at least 180°, preferably 360°.

As an improvement, the connecting device comprises a cylinder and a conductive component provided in the cylinder, two ends of the cylinder are provided with flanges, the cylinder is connected with the oil-SF6 gas bushing and the SF6 gas-air bushing respectively through the flanges at the two ends, the oil-SF6 gas bushing and the SF6 gas-air bushing are electrically connected through the conductive component, the cylinder is connected with the SF6 gas-air bushing, and the cylinder is filled with SF6 gas.

As an improvement, one end of the cylinder far away from the transformer body is provided with a second connecting flange, the other end is provided with a first connecting flange, one end of the SF6 gas-air bushing close to the transformer body is provided with a third connecting flange with a diameter smaller than the diameter of the second connecting flange, the outer side of the third connecting flange is provided with a ring part with an L-shaped cross section, the ring part is connected with the second connecting flange through bolts, and the third connecting flange is provided between the second connecting flange and the ring part. By adopting such structure, when the position of the SF6 gas-air bushing needs to be adjusted, it is only needed to loosen the bolts on the second connecting flange slightly such that the SF6 gas-air bushing can be rotated. In the process of rotation, the SF6 gas-air bushing can still maintain certain sealing with the second connecting flange, so as to reduce the leakage of SF6 gas. The SF6 gas-air bushing and the second connecting flange of the connecting device are detachably connected through bolts. During transportation, the SF6 gas-air bushing may also be disassembled from other portions of the transformer, and the SF6 gas-air bushing may be assembled and inflated when used. To ensure the sealing effect or reduce the leakage of SF6 gas during rotation, a sealing ring may be provided between the second connecting flange of the cylinder and the third connecting flange of the SF6 gas-air bushing. To ensure the sealing effect, a sealing ring is provided between the first connecting flange of the cylinder and the flange of the oil-SF6 gas bushing.

As an improvement, the conductive component is horizontally provided, the conductive component comprises a first conductive part, a second conductive part, a third conductive part, a fourth conductive part and a fifth conductive part which are sequentially connected, the first conductive part is fixedly connected with the oil-gas bushing end of the oil-SF6 gas bushing, and the second conductive part is rotatably connected with the conductive part of the SF6 gas-air bushing. The conductive component adopts a plurality of conductive parts for ease of assembly. In other solutions, the structure may also be changed to reduce the number of parts.

As an improvement, the first conductive part is connected with the oil-gas bushing end of the oil-SF6 gas bushing through screws, the second conductive part is connected with the first conductive part through screws, the third conductive part is inserted into the second conductive part, the fourth conductive part is respectively connected with the third conductive part and the fifth conductive part through screws, the conductive part is inserted into the fifth conductive part, and the screws are all horizontally provided.

As an improvement, the conductive part of the SF6 gas-air bushing comprises a conductive seat inserted into the fifth conductive part and a metal casting fixedly connected with the conductive seat, and the metal casting is provided with a horizontal part and an inclined part. The SF6 gas-air bushing needs to be at a certain angle relative to the horizontal axis to make the rotation of the SF6 gas-air bushing meaningful. It is easier to machine the horizontal part and the inclined part by using a metal casting.

As an improvement, the SF6 gas-air bushing further comprises a basin-type insulator provided on the conductive seat, and an outer end of the basin-type insulator is provided between the second connecting flange and the ring part. The basin-type insulator maintains the position of the conductive seat.

As an improvement, one end of the first conductive part close to the oil-gas bushing end is provided with a ring protrusion, and the ring protrusion partially surrounds the oil-gas bushing end along the length direction.

As an improvement, the vehicle-mounted mobile transformer further comprises a supporting seat provided below the cylinder. The supporting seat is provided on a load-bearing platform of a vehicle to maintain the position of the cylinder.

As an improvement, the cylinder is provided thereon with a moisture absorber mounting port, the cross section of the fourth conductive part is approximately U-shaped, and the opening of the fourth conductive part faces the moisture absorber mounting port. The moisture absorber mounting port may also be used for facilitating the mounting of the conductive component.

As an improvement, the vehicle-mounted mobile transformer is a 220 kV transformer; and the SF6 gas-air bushing is an SF6 gas-air composite insulating bushing.

The vehicle-mounted mobile transformer provided by the present invention has the beneficial effects that the SF6 gas-air bushing is rotatable, the position of the SF6 gas-air bushing is adjustable and thus the transportation requirement of the high-voltage (such as 220 kV) equipment is met.

In the drawings, 0—transportation vehicle;
1—transformer body;
2—oil SF6 gas bushing, 21—oil gas bushing end,
3—connecting device, 31—cylinder, 311—first connecting flange, 312—second connecting flange, 313—moisture absorber mounting port, 32—conductive component, 321—first conductive part, 322—second conductive part, 323—third conductive part, 324—fourth conductive part, 325—fifth conductive part;
4—SF6 gas-air bushing, 41—third connecting flange, 42—ring part, 43—conductive seat, 44—metal casting;
5—supporting seat;
6—supporting frame

DESCRIPTION OF THE EMBODIMENTS

The technical solutions of the embodiments of the present invention will be explained and described below with reference to the drawings of the embodiments of the present invention, but the following embodiments are only preferred embodiments of the present invention, not all of them. Other embodiments obtained by one skilled in the art based on the embodiments without contributing any inventive labor still belong to the protection scope of the present invention.

Referring to FIG. 1 to FIG. 5, the present invention provides a vehicle-mounted mobile transformer with a position-adjustable lead-out bushing, comprising:
a transformer body, the transformer body being provided with a high-voltage bushing base; and
a high-voltage lead-out bushing, the high-voltage lead-out bushing comprising an oil-SF6 gas bushing, an SF6 gas-air bushing and a connecting device, the oil-SF6 gas bushing being mounted on the high-voltage bushing base, the connecting device being mounted on the oil-SF6 gas bushing, the SF6 gas-air bushing being mounted on the connecting device, and the SF6 gas-air bushing being rotatable relative to the connecting device such that the position of the SF6 gas-air bushing is adjustable.

The vehicle-mounted mobile transformer provided by the present invention is connected with a high-voltage switch through the oil-SF6 gas bushing, the connecting device and the SF6 gas-air bushing, the SF6 gas-air bushing is rotatable relative to the connecting device, the position of the SF6 gas-air bushing is adjustable, and thus the SF6 gas-air bushing can be rotated to a suitable position for transportation; the transformer is connected with the high-voltage switch through the SF6 gas-air bushing, and thus it is easier to operate than when it is directly connected with the high-voltage switch through the oil-gas bushing. The rotation angle of the SF6 gas-air bushing is at least 180°, preferably 360°.

Embodiment 1

Figure 1:
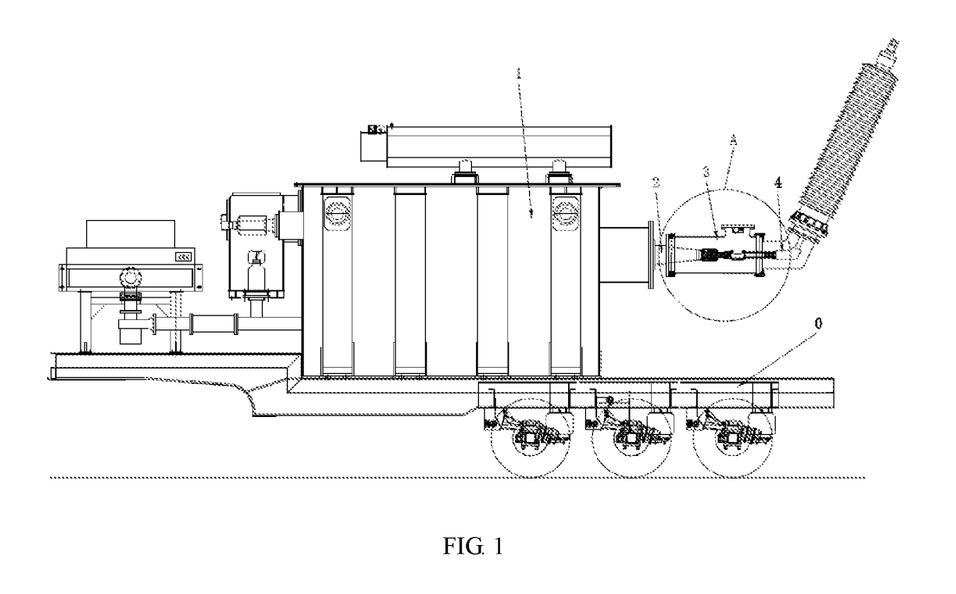
FIG. 1 illustrates a structural schematic view of a vehicle-mounted mobile transformer according to embodiment 1 of the present invention (in a used state).
Figure 2:
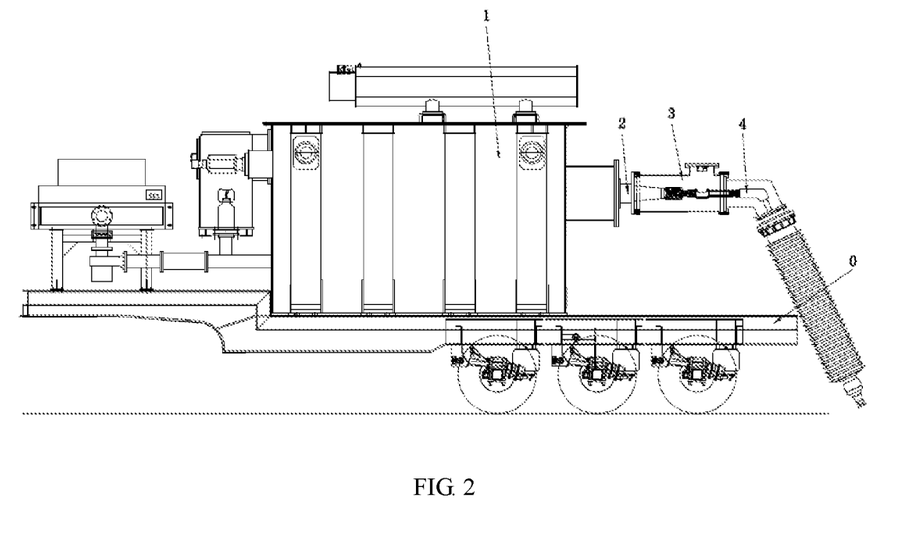
FIG. 2 illustrates a structural schematic view of a vehicle-mounted mobile transformer according to embodiment 1 of the present invention (in a transported state).
Figure 3:
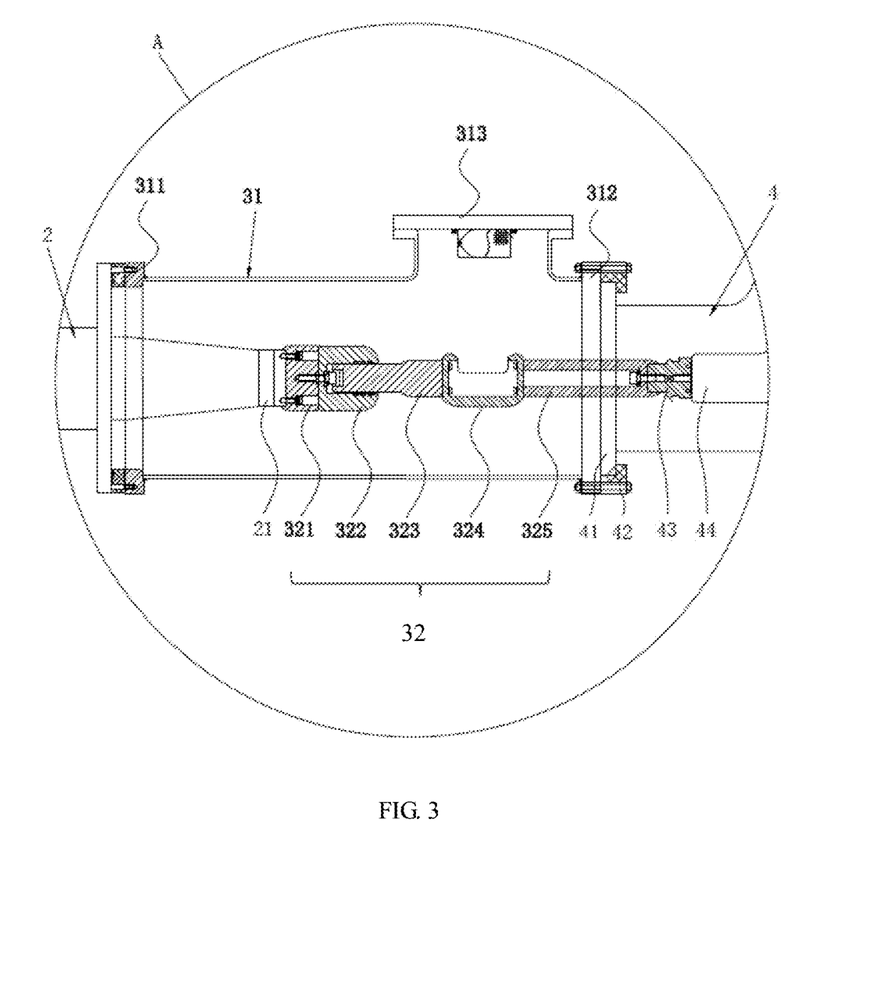
FIG. 3 illustrates a partially enlarged view of a position A in FIG. 1.

With reference to FIG. 1 to FIG. 3, embodiment 1 of the present invention provides a vehicle-mounted mobile transformer with a position-adjustable lead-out bushing, comprising:
a transformer body 1, the transformer body 1 being provided with a high-voltage bushing base; and
a high-voltage lead-out bushing, the high-voltage lead-out bushing comprising an oil-SF6 gas bushing 2, an SF6 gas-air bushing 4 and a connecting device 3, the oil-SF6 gas bushing 2 being mounted on the high-voltage bushing base, the connecting device 3 being mounted on the oil-SF6 gas bushing 2, the SF6 gas-air bushing 4 being mounted on the connecting device 3, and the SF6 gas-air bushing 4 being rotatable relative to the connecting device 3 such that the position of the SF6 gas-air bushing 4 is adjustable.

The vehicle-mounted mobile transformer is mounted on a load-bearing platform on a transportation vehicle 0.

As an improvement, the connecting device 3 comprises a cylinder 31 and a conductive component 32 provided in the cylinder 31, two ends of the cylinder 31 are provided with flanges, and the cylinder 31 is connected with the oil-SF6 gas bushing 2 and the SF6 gas-air bushing 4 respectively through the flanges at the two ends, the oil-SF6 gas bushing 2 and the SF6 gas-air bushing 4 are electrically connected through the conductive component 32, the cylinder 31 is connected with the SF6 gas-air bushing 4, and the cylinder 31 is filled with SF6 gas.

As an improvement, one end of the cylinder 31 far away from the transformer body 1 is provided with a second connecting flange 312, the other end is provided with a first connecting flange 311, one end of the SF6 gas-air bushing 4 close to the transformer body 1 is provided with a third connecting flange 41 with a diameter smaller than the diameter of the second connecting flange 312, an outer side of the third connecting flange 41 is provided with a ring part 42 with an L-shaped cross section, the ring part 42 is connected with the second connecting flange 312 through bolts, and the third connecting flange 41 is provided between the second connecting flange 312 and the ring part 42. By adopting such structure, when the position of the SF6 gas-air bushing 4 needs to be adjusted, it is only needed to loosen the bolts on the second connecting flange 312 slightly such that the SF6 gas-air bushing 4 can be rotated. In the process of rotation, the SF6 gas-air bushing 4 can still maintain certain sealing with the second connecting flange 312, so as to reduce the leakage of SF6 gas. The SF6 gas-air bushing 4 and the second connecting flange 312 of the connecting device 3 are detachably connected through bolts. During transportation, the SF6 gas-air bushing 4 may also be disassembled from other portions of the transformer, and the SF6 gas-air bushing 4 may be assembled and inflated when used.

As an improvement, the conductive component 32 is horizontally provided, the conductive component 32 comprises a first conductive part 321, a second conductive part 322, a third conductive part 323, a fourth conductive part 324 and a fifth conductive part 325 which are sequentially connected, the first conductive part 321 is fixedly connected with an oil-gas bushing end 21 of the oil-SF6 gas bushing 2, and the second conductive part 322 is rotatably connected with the conductive part of the SF6 gas-air bushing 4. The conductive component 32 adopts a plurality of conductive parts for ease of assembly. In other solutions, the structure may also be changed to reduce the number of parts.

As an improvement, the first conductive part 321 is connected with the oil-gas bushing end 21 of the oil-SF6 gas bushing 2 through screws, the second conductive part 322 is connected with the first conductive part 321 through screws, the third conductive part 323 is inserted into the second conductive part 322, the fourth conductive part 324 is respectively connected with the third conductive part 323 and the fifth conductive part 325 through screws, the conductive part is inserted into the fifth conductive part 325, and the screws are all horizontally provided.

As an improvement, the conductive part of the SF6 gas-air bushing 4 comprises a conductive seat 43 inserted into the fifth conductive part 325 and a metal casting 44 fixedly connected with the conductive seat 43, and the metal casting 44 is provided with a horizontal part and an inclined part. The SF6 gas-air bushing 4 needs to be at a certain angle relative to the horizontal axis to make the rotation of the SF6 gas-air bushing 4 meaningful. It is easier to machine the horizontal part and the inclined part by using a metal casting 44.

As an improvement, the SF6 gas-air bushing 4 further comprises a basin-type insulator provided on the conductive seat 43, and an outer end of the basin-type insulator is provided between the second connecting flange 312 and the ring part 42. The basin-type insulator maintains the position of the conductive seat 43.

As an improvement, one end of the first conductive part 321 close to the oil-gas bushing end 21 is provided with a ring protrusion, and the ring protrusion partially surrounds the oil-gas bushing end 21 along the length direction.

As an improvement, the fifth conductive part 325 and the conductive seat 43 are connected through screws but not fastened, and the fifth conductive part 325 and the conductive seat 43 are axially limited through screws, so as to reduce shaking.

As an improvement, the cylinder 31 is provided thereon with a moisture absorber mounting port 313, the cross section of the fourth conductive part 324 is approximately U-shaped, and the opening of the fourth conductive part 324 faces the moisture absorber mounting port 313.

As an improvement, the vehicle-mounted mobile transformer is a 220 kV transformer; and the SF6 gas-air bushing 4 is an SF6 gas-air composite insulating bushing.

The vehicle-mounted mobile transformer according to embodiment 1 of the present invention has the beneficial effects that the SF6 gas-air bushing 4 is rotatable, the position of the SF6 gas-air bushing 4 is adjustable and thus the transportation requirement of high-voltage (such as 220 kV) equipment is met; and the cylinder 31 and the SF6 gas-air bushing 4 are connected by adopting the ring part 42 with the L-shaped cross section, the structure is simple and the SF6 gas-air bushing 4 can be rotated easily.

Embodiment 2

Figure 4:
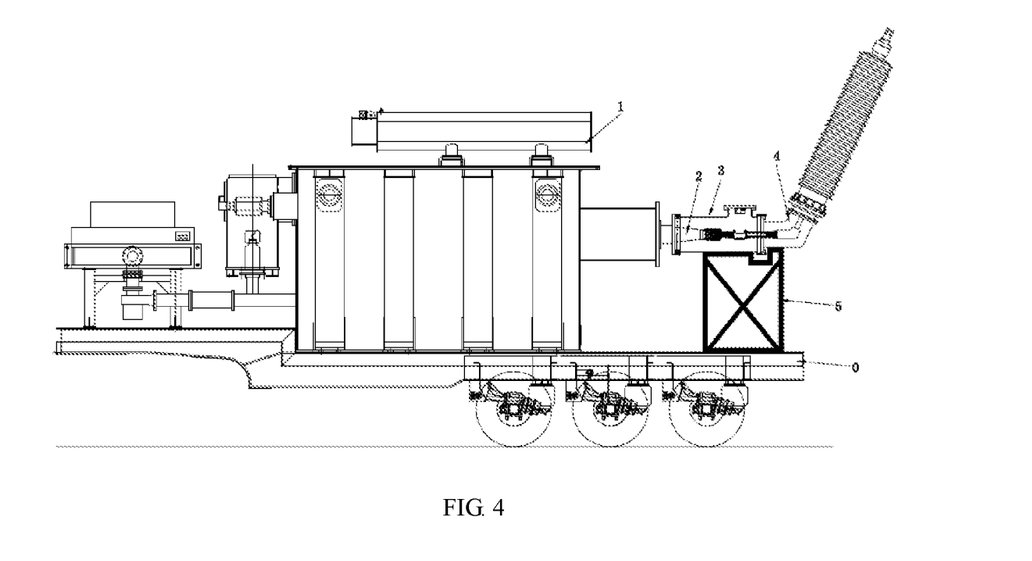
FIG. 4 illustrates a structural schematic view of a vehicle-mounted mobile transformer according to embodiment 2 of the present invention (in a used state).
Figure 5:
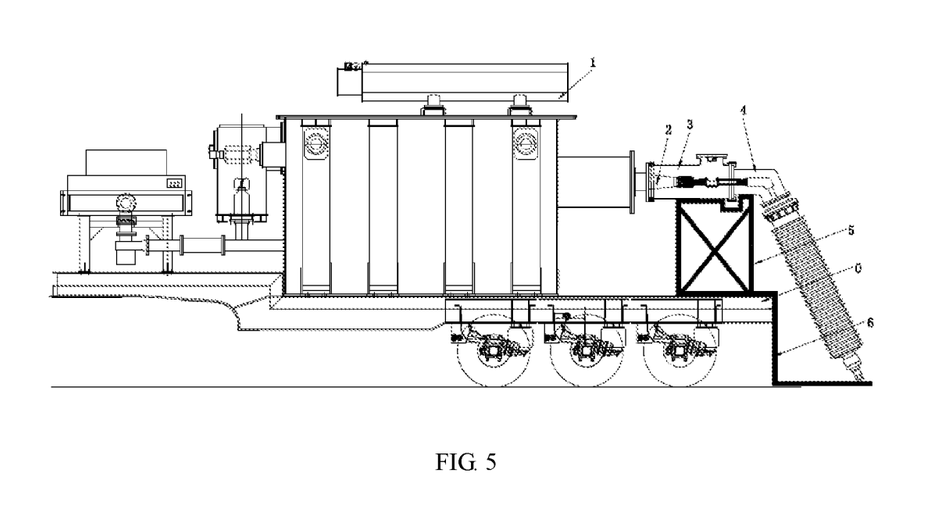
FIG. 5 illustrates a structural schematic view of a vehicle-mounted mobile transformer according to embodiment 2 of the present invention (in a transported state).

The difference of embodiment 2 from embodiment 1 is that a supporting seat 5 and a supporting frame 6 are further provided.

Referring to FIG. 4 and FIG. 5, as an improvement, the vehicle-mounted mobile transformer further comprises a supporting seat 5 provided below the cylinder 31. The supporting seat 5 is provided on a load-bearing platform of a transportation vehicle 0 to maintain the position of the cylinder 31.

The supporting seat 5 supports the cylinder 31 of the connecting device 3 and the SF6 gas-air bushing 4 at the same time, so as to make the SF6 gas-air bushing 4 rotate easily and reduce the shaking during transportation. An upper end of the supporting seat 5 is provided with a groove, and the second connecting flange 312 and the L-shaped part 42 are positioned in the groove.

As an improvement, a supporting frame 6 is further fixedly connected on the load-bearing platform of the transportation vehicle 0 and the supporting seat 5, and the supporting frame 6 supports a lower end of the SF6 gas-air bushing 4 to reduce the shaking of the SF6 gas-air bushing 4 during transportation.

Other structures and effects of embodiment 2 are the same as that of embodiment 1, which are not repetitively described here.

The above are only the specific embodiments of the present invention, but the protection scope of the present invention is not limited thereto. One skilled in the art should understand that the present invention includes but not limited to the content described in the drawings and in the above specific embodiments. Any modification made without deviating from the function and structural principle of the present invention shall be included in the scope of the claims.

The invention claimed is:

1. A vehicle-mounted mobile transformer with a position-adjustable high-voltage lead-out bushing, wherein the vehicle-mounted mobile transformer comprises: a transformer body (1), the transformer body (1) being provided with a high-voltage bushing base; and the position-adjustable high-voltage lead-out bushing (2,3,4), the position-adjustable high-voltage lead-out bushing (2,3,4) comprising an oil-SF6 gas bushing (2), an SF6 gas-air bushing (4) and a connecting device (3), the oil-SF6 gas bushing (2) being mounted on the high-voltage bushing base, the connecting device (3) being mounted on the oil-SF6 gas bushing (2), the SF6 gas-air bushing (4) being mounted on the connecting device (3), and the SF6 gas-air bushing (4) being rotatable relative to the connecting device (3) such that the position of the SF6 gas-air bushing (4) is adjustable.

2. The vehicle-mounted mobile transformer with the position-adjustable high-voltage lead-out bushing according to claim 1, wherein the connecting device (3) comprises a cylinder (31) and a conductive component (32) provided in the cylinder (31), two ends of the cylinder (31) are respectively connected with the oil-SF6 gas bushing (2) and the SF6 gas-air bushing (4), the oil-SF6 gas bushing (2) and the SF6 gas-air bushing (4) are electrically connected through the conductive component (32), the cylinder (31) is connected with the SF6 gas-air bushing (4), and the cylinder (31) is filled with SF6 gas.

3. The vehicle-mounted mobile transformer with the position-adjustable high-voltage lead-out bushing according to claim 2, wherein one end of the cylinder (31) far away from the transformer body (1) is provided with a second connecting flange (312), another end of the cylinder (31) is provided with a first connecting flange (311), one end of the SF6 gas-air bushing (4) close to the transformer body (1) is provided with a third connecting flange (41) with a diameter smaller than the diameter of the second connecting flange (312), the outer side of the third connecting flange (41) is provided with a ring part (42) with an L-shaped cross section, the ring part (42) is connected with the second connecting flange (312) through bolts, and the third connecting flange (41) is provided between the second connecting flange (312) and the ring part (42).

4. The vehicle-mounted mobile transformer with the position-adjustable high-voltage lead-out bushing according to claim 2, wherein the conductive component (32) is horizontally provided, the conductive component (32) comprises a first conductive part (321), a second conductive part (322), a third conductive part (323), a fourth conductive part (324) and a fifth conductive part (325) which are sequentially connected, the first conductive part (321) is fixedly connected with an oil-gas bushing end (21) of the oil-SF6 gas bushing (2), and the second conductive part (322) is rotatably connected with a conductive part (43, 44) of the SF6 gas-air bushing (4).

5. The vehicle-mounted mobile transformer with the position-adjustable high-voltage lead-out bushing according to claim 4, wherein the first conductive part (321) is connected with the oil-gas bushing end (21) of the oil-SF6 gas bushing (2) through screws, the second conductive part (322) is connected with the first conductive part (321) through screws, the third conductive part (323) is inserted into the second conductive part (322), the fourth conductive part (324) is respectively connected with the third conductive part (323) and the fifth conductive part (325) through screws, the conductive part is inserted into the fifth conductive part (325), and the screws are all horizontally provided.

6. The vehicle-mounted mobile transformer with the position-adjustable high-voltage lead-out bushing according to claim 5, wherein the conductive part (43, 44) of the SF6 gas-air bushing (4) comprises a conductive seat (43) inserted into the fifth conductive part (325) and a metal casting (44) fixedly connected with the conductive seat (43), and the metal casting (44) is provided with a horizontal part and an inclined part.

7. The vehicle-mounted mobile transformer with the position-adjustable high-voltage lead-out bushing according to claim 6, wherein the SF6 gas-air bushing (4) further comprises a basin-type insulator provided on the conductive seat (43), and an outer end of the basin-type insulator is provided between the second connecting flange (312) and the ring part (42).

8. The vehicle-mounted mobile transformer with the position-adjustable high-voltage lead-out bushing according to claim 4, wherein one end of the first conductive part (321) close to the oil-gas bushing end (21) is provided with a ring protrusion, and the ring protrusion partially surrounds the oil-gas bushing end (21) along the length direction.

9. The vehicle-mounted mobile transformer with the position-adjustable high-voltage lead-out bushing according to claim 2, wherein the vehicle-mounted mobile transformer further comprises a supporting seat (5) provided below the cylinder (31); and a supporting frame (6) used for maintaining the position of the SF6 gas-air bushing (4) in the transportation of the vehicle-mounted mobile transformer.

10. The vehicle-mounted mobile transformer with the position-adjustable high-voltage lead-out bushing according to claim 2, wherein the cylinder (31) is provided thereon with a moisture absorber mounting port (313), a cross section of the fourth conductive part (324) is approximately U-shaped, and an opening of the fourth conductive part (324) faces the moisture absorber mounting port (313); the vehicle-mounted mobile transformer is a 220 kV transformer; and the SF6 gas-air bushing (4) is an SF6 gas-air composite insulating bushing.

\* \* \* \* \*